United States Patent
Newell et al.

[11] Patent Number: 5,921,015
[45] Date of Patent: Jul. 13, 1999

[54] FISHING LINE RELEASE CLIP

[75] Inventors: Roger T. Newell; Tommy L. Carter, both of Seaside, Calif.

[73] Assignee: E-Z Catch and Company, Carmel, Calif.

[21] Appl. No.: 08/589,221

[22] Filed: Jan. 22, 1996

[51] Int. Cl.⁶ .................................................. A01K 91/03
[52] U.S. Cl. ............................ 43/43.12; 24/537; 24/503; 24/335
[58] Field of Search .................... 43/43.12; 403/DIG. 9; 24/537, 515, 503, 335

[56] References Cited

U.S. PATENT DOCUMENTS

| | | | |
|---|---|---|---|
| 344,651 | 6/1886 | Hallbauer | 24/537 |
| 474,719 | 5/1892 | Brande | 24/503 |
| 893,466 | 7/1908 | Durham | 24/537 |
| 1,193,895 | 8/1916 | Hemingway | 24/537 |
| 1,634,532 | 7/1927 | Bowe | 24/503 |
| 1,692,917 | 11/1928 | Allenic | 24/515 |
| 1,804,308 | 5/1931 | Bollinger | 24/515 |
| 2,162,466 | 6/1939 | Wood | 24/515 |
| 2,170,594 | 8/1939 | Nicholson | 43/43.12 |
| 2,583,680 | 1/1952 | Brennan | 24/537 |
| 2,654,957 | 10/1953 | Grant | 24/537 |
| 3,026,646 | 3/1962 | Weaver | 43/43.12 |
| 3,357,126 | 12/1967 | Klieves | 43/43.12 |
| 3,387,344 | 6/1968 | Santi | 24/335 |
| 3,462,870 | 8/1969 | Terilli | 43/43.12 |
| 3,659,370 | 5/1972 | Ritter | 24/537 |
| 3,959,913 | 6/1976 | Weber | 43/43.12 |
| 4,463,482 | 8/1984 | Hawie | 24/515 |
| 4,513,524 | 4/1985 | Jolliff | 43/43.12 |
| 4,565,026 | 1/1986 | Bohme | 43/43.12 |
| 4,698,933 | 10/1987 | Shaw | 43/43.12 |
| 4,802,265 | 2/1989 | Stevenson | 24/335 |
| 4,825,583 | 5/1989 | Kammeraad | 43/43.13 |
| 4,942,690 | 7/1990 | Lund | 43/43.12 |
| 4,945,670 | 8/1990 | Wetherald | 43/43.12 |
| 5,152,095 | 10/1992 | Combs, III | 43/43.12 |
| 5,163,246 | 11/1992 | Shaw | 43/43.12 |
| 5,564,166 | 10/1996 | Roy | 24/335 |

FOREIGN PATENT DOCUMENTS

| | | | |
|---|---|---|---|
| 64816 | 11/1949 | Netherlands | 24/537 |

*Primary Examiner*—Michael J. Carone
*Assistant Examiner*—Darren Ark
*Attorney, Agent, or Firm*—David O'Reilly

[57] ABSTRACT

A fishing line release clip, having dual clamps and a design that allows the release clip to use for a variety of applications. The release clip is comprised of a clamping platform, having a clamping surfaces on either end, and amounting flange on one end. A pair of clamping plates are provided that are connected by hinges to the sidewalls of the clamping plate. Each clamping plate is provided with a sliding clamp to force the clamping plate down against the clamping platform. A resilient textured clamping pad is provided beneath each clamping plate. In one embodiment, the clamping pads are provided with bosses fitting sockets in the clamping plate and the clamping platform. The flange end of the clamping platform includes a pair of V-shaped grooves for receiving a cable to securely lock the cable to the release clip. Optional embodiments of the invention are provided in which the clamping force is provided by button clamps while in a third embodiment, the clamping plates are provided in a single molded piece having a self-hinge and are clamped by thumbwheels.

17 Claims, 5 Drawing Sheets

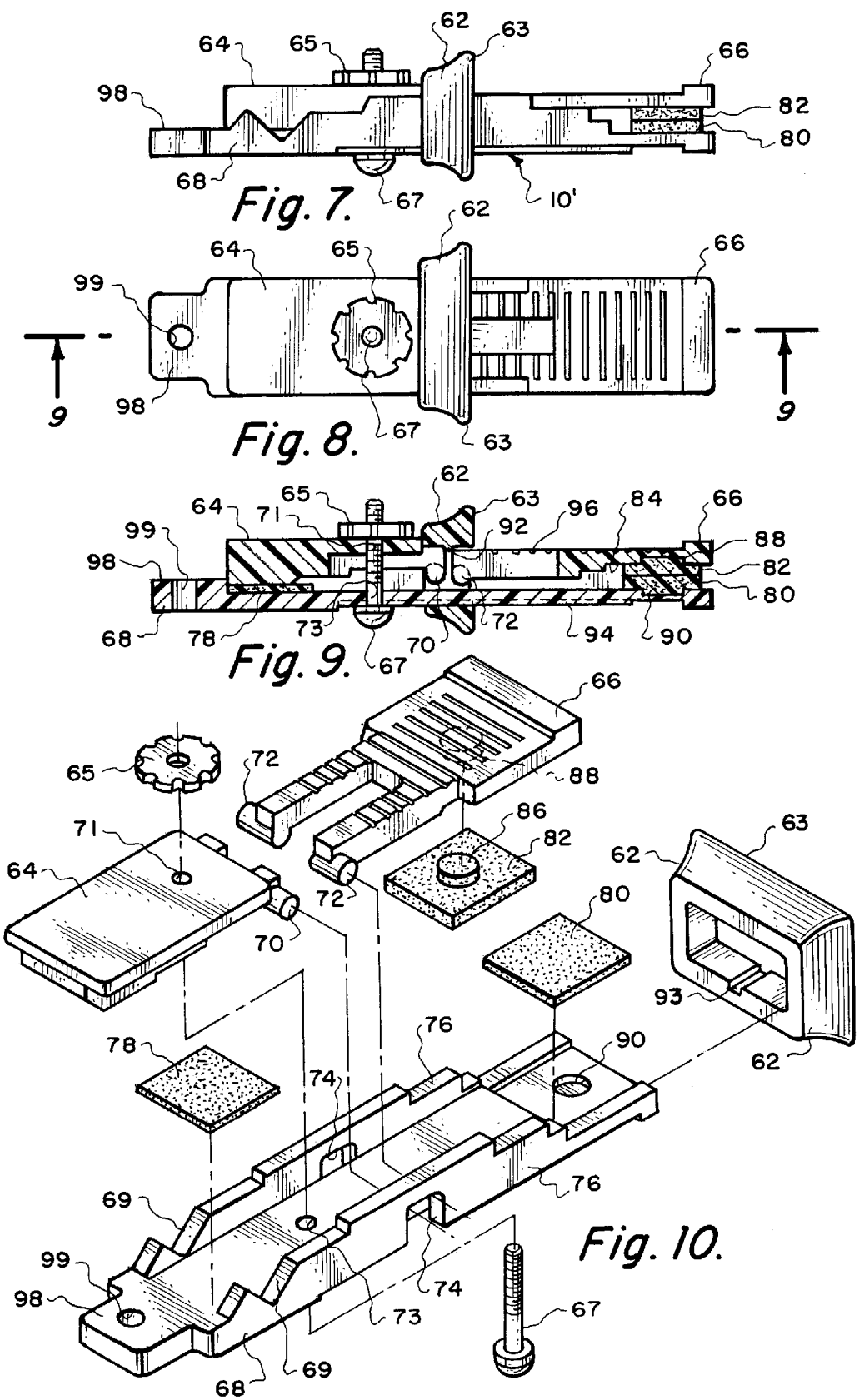

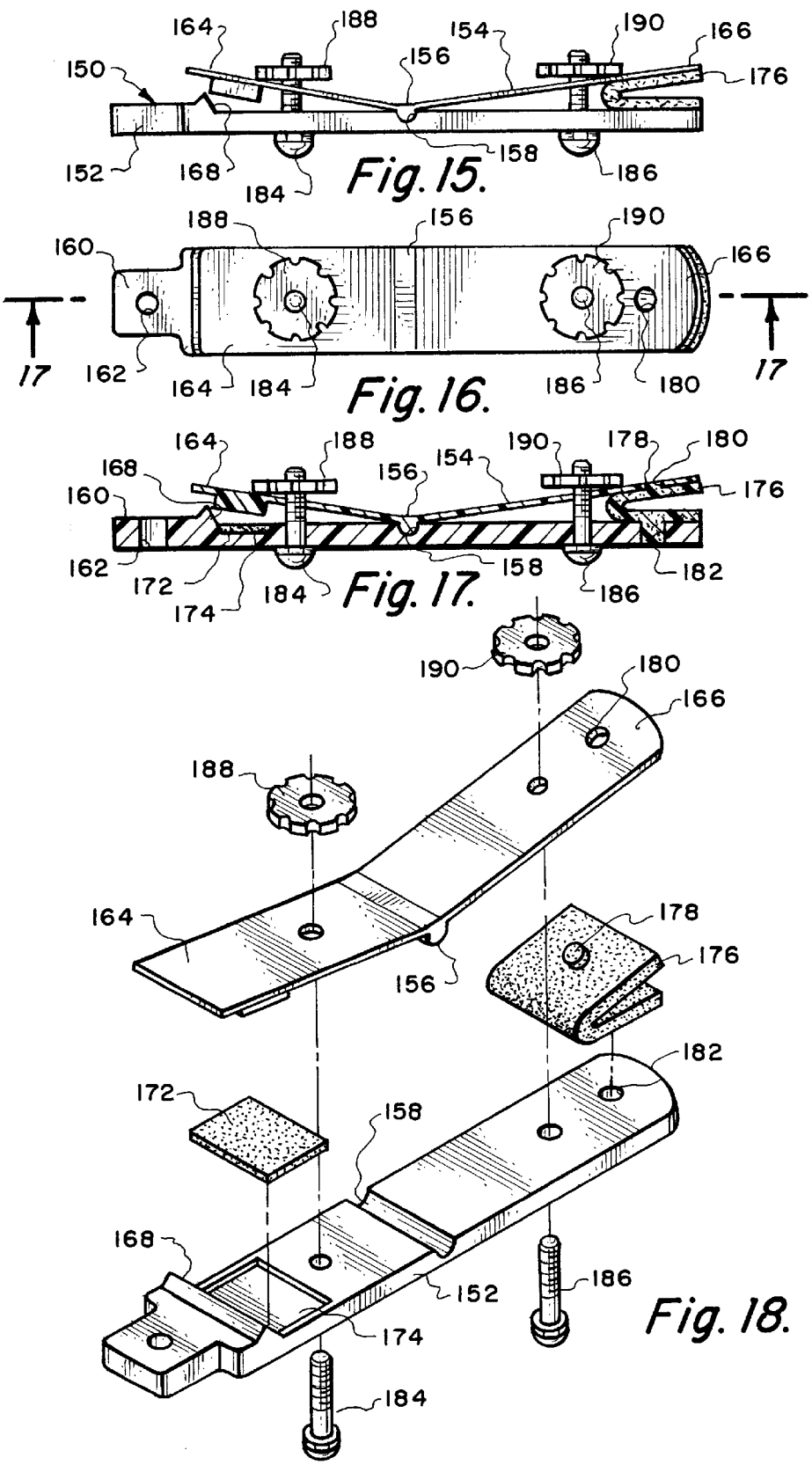

FISHING LINE RELEASE CLIP

BACKGROUND OF THE INVENTION

1. Field of the Invention

This invention relates to release clips for fishing lines and more particularly, relates to a double-ended release clip that is designed for use with cable and fishing line.

2. Background Information

Release clips are used on boats, particularly for outriggers to hold the fishing line when trolling. The release clip is usually constructed of a mounting plate, a clamping plate, a resilient insert to receive the fishing line and a thumbwheel for tightening the clamping plate against the mounting plate. The amount of gripping force is adjusted by tightening the thumbwheel. These devices have a single clamping jaw to clamp and hold a fishing line when trolling. It is not generally suitable for all types of fishing line.

Some release clamps are also used for down-rig fishing with a weighted cable. The weighted cable is dropped in the water and release clips attached at various depths to hold multiple fishing lines. Release clips presently available have frictionally clamping fingers through which the cable is weaned. The finger arrangement secures the release clip to the cable and allows the clip to slide on the cable. There is no way to tighten the grip of the fingers on the cable. An effective, very "clumsy" solution to this problem is to use two clips joined by a tether.

It would be advantageous if a release clip could be provided that would be suitable for use with either a cable or a fixed mount. That is, the clip should permit clamping to a fishing line, but could also be used to securely clamp the release clip to a cable. The device should also be designed to easily mount a cable and/or line in the clamping jaws.

It is therefore, one object of the present invention, to provide a fishing line release clip that is suitable for use with a fishing line and/or with a cable.

Still another object of the present invention is to provide a release clip that has a pair of clamping jaws with one clamping jaw being suitable for a cable, and the other clamping jaw being suitable for a fishing line.

Yet another object of the present invention is to provide a fishing line release clip designed to provide quick and easy clamping pressure.

Yet another object of the present invention is to provide a fishing line release clip having clamping sliders that can quickly and easily apply a clamping force to a cable or fishing line placed in each jaw.

Still another object of the present invention is to provide a fishing line release clip having a platform designed to receive cable on one end and a fishing line on the other.

Yet another object of the present invention is to provide a fishing line release clip having a clamping platform and clamping plate secured by hinge posts into a hinge slot in the sidewalls of the platform.

Still another object of the present invention is to provide a fishing line release clip in which sliding clamps have a locking feature to lock the sliders in place when a fishing line is clamped in the jaw.

Yet another object of the present invention is to provide a fishing line release clip having sliding clamps with a rib or ridge that engages detents in the surface of the clamping plates to incrementally increase the clamping force and lock the sliding clamp in place.

Still another object of the present invention is to provide a fishing line release clip having a platform and clamping plates that receive resilient clamping pads, having a textured surface to increase the holding force on a cable or fishing line.

Still another object of the present invention is to provide a fishing line release clip having resilient textured pads with a boss that fit sockets in the platform and clamping plates to retain the resilient pads in the clamping jaws.

Still another object of the present invention is to provide a fishing line release clip that is manufactured of synthetic material that has no metal parts to rust or deteriorate.

Still another object of the present invention is to provide a fishing line release clip having sliding clamps to apply an increasing force to clamping plates that provide a graduating ramp allowing the user to quickly and easily adjust the amount of clamping pressure. A rib, on the sliding clamp, engages detents on the clamping plates to provide locking security so that setting and release of the sliders is smooth, positive and reliable.

Another object of the present invention is to provide a fishing line release clip that uses sliders to engage and lock the clamping plates into position to avoid the use of metal springs or threaded nuts and bolts. The sliding clamps and detents lock the clamping jaws into place and provide a unique advantage over present use of metal thumbscrews, ring nuts, springs and bolts that can rust and fall off.

Still another object of the present invention is to provide a fishing line release clip that provides clamping capability at both ends of the clamping platform which is unique in release clip design.

Still another object of the present invention is to provide a fishing line release clip that includes a cavity for receiving a cable line between the clamping plate and the platform behind two guides to securely hold the cable.

Still another object of the present invention is to provide a fishing line release clip that is uniquely designed to have more applications in a single unit than clips presently known on the market.

Yet another object of the present invention is to provide a fishing line release clip with a mounting flange for mounting the release clip to a surface or to tie it by a tether to a cable.

BRIEF DESCRIPTION OF THE INVENTION

The purpose of the present invention is to provide a fishing line release clip that is efficient, easy to use and has more applications than fishing line release clips presently available.

The release clip of the present invention is comprised of a clamping platform designed to provide two clamping jaws. One end of the platform is flat and has a surface for receiving a textured resilient pad. The other end of the platform has a pair of grooves or V-shaped notches for receiving a cable, and a second resilient rubber pad for use in down-rig fishing with multiple lines. Clamping plates are mounted on the clamping platform with hinge posts that fit into hinge slots in the sidewalls of the platform.

One or more clamping sliders are provided to securely lock the clamping plates against the clamping platform. The sliding clamp clamps the fishing line between the clamping plate and the clamping platform by ramping up the clamping plate and locking into place. Each sliding clamp is locked in place by detents in the surface of the clamping plate receiving a ridge or rib on the sliding clamp.

One end of the release clip has a jaw for receiving a fishing line, while the other end is designed for receiving a cable for down-rig fishing. The cable end has a notch or V-shaped groove for positioning the wire line and a textured rubber pad in a cavity in the clamping platform. The V-shaped groove is designed with a depth to accept the thickest cable and guard or protect against the cable coming out of the groove. The clamping plate is securely clamped down on the cable fitted into the cable grooves by the sliding clamp which locks in place by engaging detents in the surface of the clamping plate.

At the opposite end, a replaceable textured rubber clamping pad is fitted between the clamping plate and the clamping platform. Preferably, recesses in the clamping plate and the clamping platform aid in holding the replaceable resilient or rubber clamping pad in place. Also, sockets may be provided in the platform and clamping plate for receiving a boss on the resilient rubber clamping pad to further assist in holding it in place.

A fishing line is clamped in place by inserting it into the jaw between the resilient textured rubber clamping pad and advancing the sliding clamp toward the jaw. The sliding clamp has a ridge engaging detents in the clamping plate to securely lock the sliding clamp in place once the line is securely clamped between the textured resilient rubber clamping pad.

A mounting flange is provided at one end of the clamping platform so that the fishing line release clip may be mounted on any suitable surface such as a mounting arm, or may be tethered to a cable with snap rings. For example, the fishing line release clip could be mounted on an extension of the fish hook setting device disclosed and described in U.S. Pat. application Ser. No. 08/504,646 filed Jul. 20, 1995. Obviously a mounting flange could be provided on either or both ends of the mounting platform so that either clamping jaw could be on the outboard end of the fishing line release clip.

The above and other novel features of the invention will be more fully understood from the following detailed description and the accompanying drawings, in which:

BRIEF DESCRIPTION OF THE DRAWINGS

FIG. 7 is a side elevation of an optional design of the fishing line release clip of FIGS. 1 through 6.

FIG. 8 is a top view of the optional embodiment of FIG. 7.

FIG. 9 is a sectional view taken at 9—9 of FIG. 8.

FIG. 10 is an exploded view illustrating the assembly of the fishing line release clip of FIG. 7.

FIG. 15 is a side elevation of a fourth embodiment of the release clip according to the invention.

FIG. 16 is a top view of the fourth embodiment of the fishing line release clip.

FIG. 17 is a sectional view taken at 17—17 of FIG. 16.

FIG. 18 is an exploded view of the embodiment of FIG. 15.

DETAILED DESCRIPTION OF THE INVENTION

Figure 1:
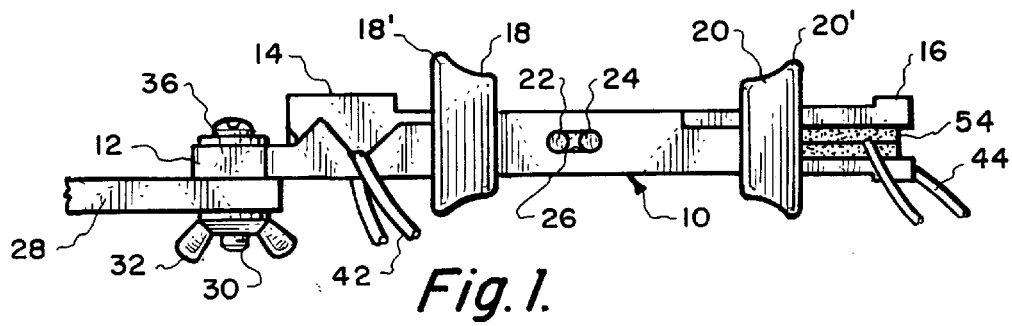
FIG. 1 is a side elevation of a fishing line release clip constructed according to the invention.
Figure 2:
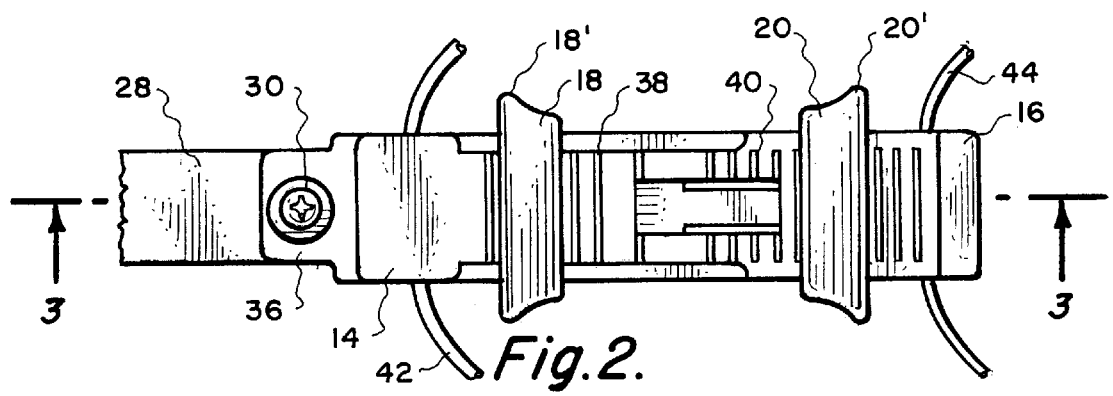
FIG. 2 is a top view of the fishing line release clip of FIG. 1.
Figure 3:
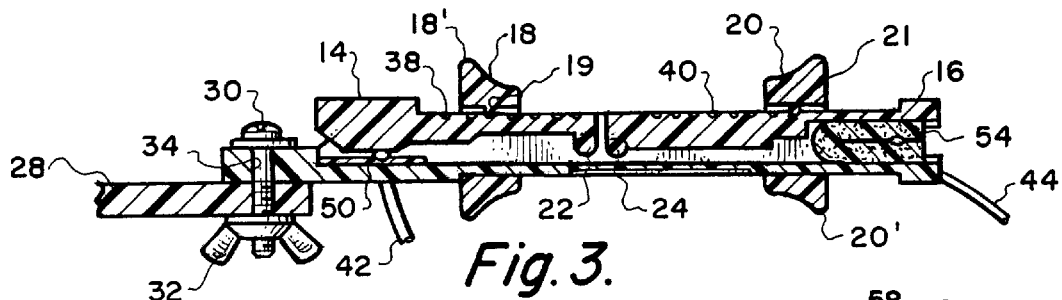
FIG. 3 is a sectional view taken at 3—3 of FIG. 2.
Figure 4:
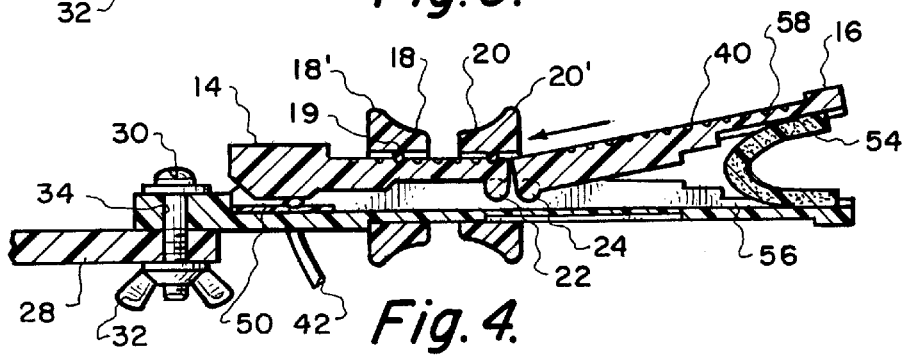
FIG. 4 is a sectional view similar to FIG. 3 illustrating the operation of the fishing line release clip.
Figure 5:
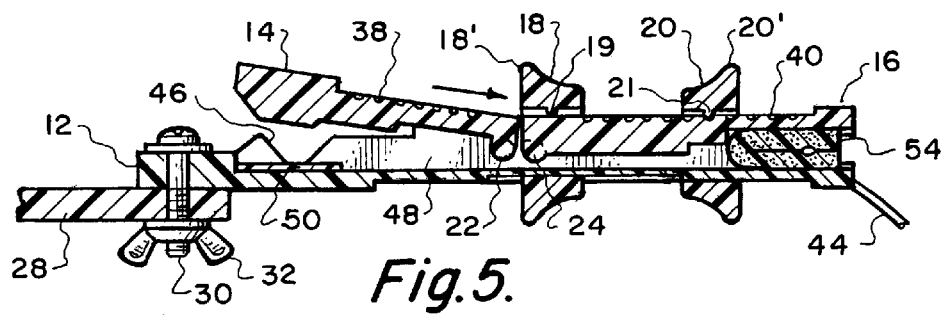
FIG. 5 is a sectional view similar to FIG. 3 further illustrating operation of the fishing line release clip.

The simple and unique design of the fishing line release clip, according to the invention, is illustrated in FIGS. 1 through 6. Fishing line release clip 10 is comprised of a clamping platform 12, clamping plates 14 and 16, and sliding clamps 18 and 20. Clamping plates 14 and 16 provide a pair of clamping jaws at either end of clamping platform 12. Clamping plates 14 and 16 are mounted on clamping platform 12 by hinge posts 22 and 24 engaging hinge slot 26 as will be described in greater detail hereinafter.

Fishing line release clip 10 is mounted on any suitable surface such as a mounting arm or plate 28 by a bolt 30 and thumbscrew 32 through a hole 34 in flange 36 at the end of clamping platform 12. If desired, mounting flange 36 can be provided on either or both ends of clamping platform 12. For example, fishing line release clip 10 is suitable for use on extension or arm 28 such as that shown and described in U.S. Pat. application Ser. No. 08/504,646 filed Jul. 20, 1995.

Flange 36 and mating hole 34 can also be used as a back-up device to prevent loss of the clip if it should come off cable 42. When the release clip is used on a cable for down-rig fishing a tether, fastened by snap rings to hole 34 at one end and cable 42 at the other end, provide a back-up retainer in the unlikely event that the release clip should come off the cable.

Sliding clamps 18 and 20 are designed to ramp up the surface of clamping plates 14 and 16 to easily and comfortably apply an adjustable clamping force to a cable and fishing line held in the clamping jaws and lock in place. A lock is provided by a rib or ridge 19 and 21 (FIGS. 3 through 5) on each sliding clamp that engage detents 38 and 40 in respective clamping plates 14 and 16. This provides locking security for the position of sliding clamps 18 and 20 to securely hold fishing line release clip 10 on cable 42 or line 44.

The unique design of two different clamping jaws provide a fishing line release clip that has more applications in a single device than release clips currently available on the market. Clamping plate 14 provides a clamp for cable 42 that securely holds the position on the cable by means of a sawtooth notch or V-shaped groove 46 in sidewalls 48 of clamping platform 12. V-shaped groove 46 is designed to accept the smallest to the largest diameter cable.

Tooth 47 formed by V-shape groove 46 should be high enough to guard or protect against even the thickest cable from slipping out of the clamp. A textured resilient pad 50 is seated in a recess 52 in clamping platform 12, beneath cable clamping plate 14.

The fishing clamping plate 16 forms a jaw for use with synthetic or glass fishing line 44. The fishing line clamping jaw includes a resilient rubber clamping pad 54 also having a textured surface for securely clamping fishing line 44. Resilient rubber clamping pad 54 can be a folded resilient sheet fitting recesses 56 and 58 in clamping platform 12 and clamping plate 16 respectively.

Sliding clamps 18 and 20 have peripheral shoulders 18' and 20' to make it easy to advance each sliding clamp toward the clamping end, particularly when they are both together at the center of the release clip. Since the entire assembly is rather small, shoulders 18' and 20' provide a pushing surface for the fingers, allowing the user to grasp either sliding clamp 18 or 20. When both sliding clamps devices 18 and 20 are pushed together at the center of release clip 10, they form a concave cavity for receiving fingers. The user can then easily grasp one or the other and move it forward toward the clamping end by applying pressure to either shoulder 18' or 20'.

Figure 6:
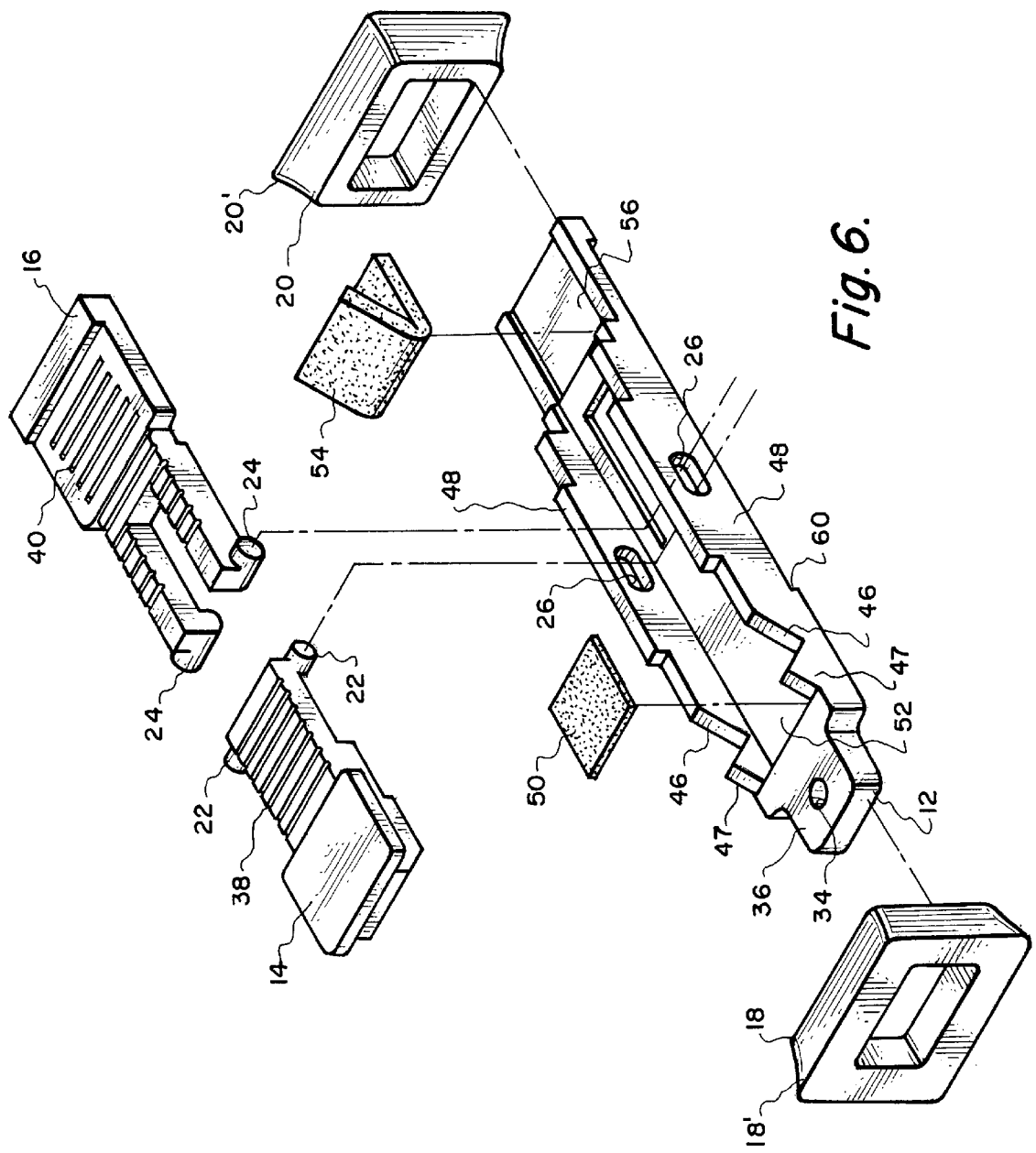
FIG. 6 is an exploded view illustrating the assembly of the fishing line release clip according to the invention.
Figure 11:
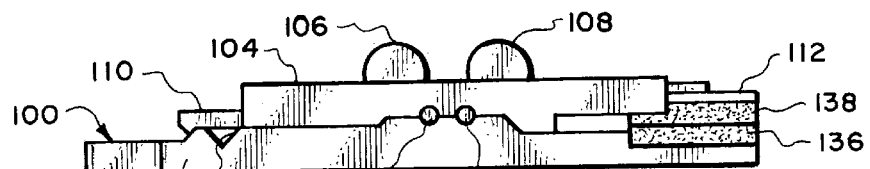
FIG. 11 is a side elevation of a third embodiment of the fishing line release clip.
Figure 12:
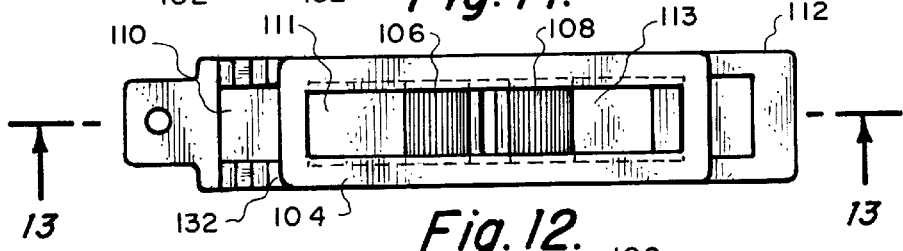
FIG. 12 is a top view of the optional embodiment of FIG. 11.
Figure 13:
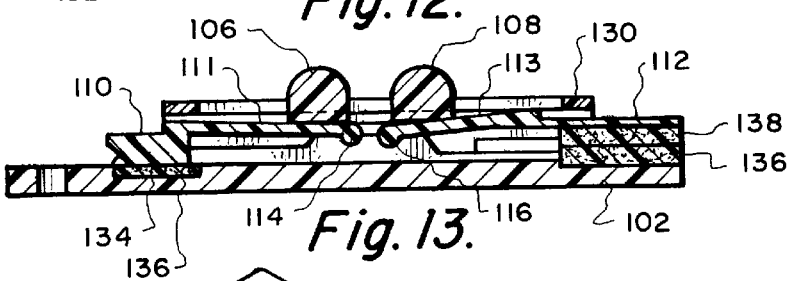
FIG. 13 is a sectional view of the optional embodiment of FIG. 11 taken at 13—13 of FIG. 12.
Figure 14:
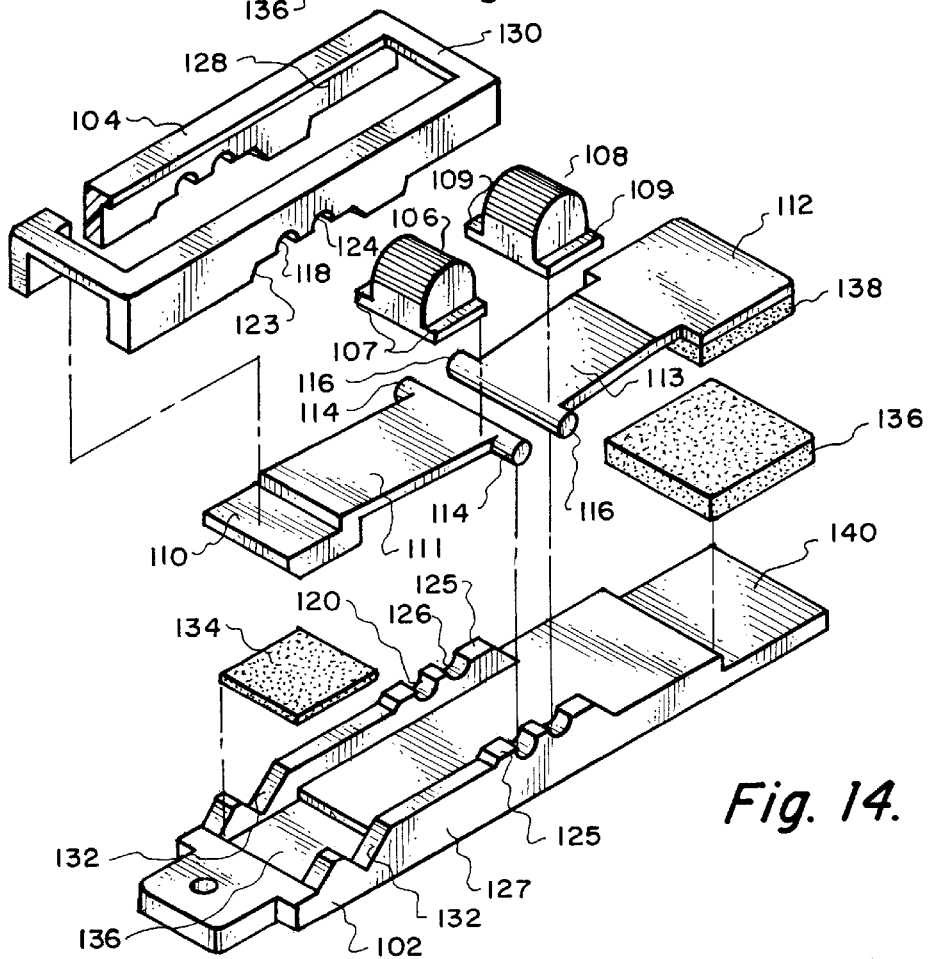
FIG. 14 is an exploded view of the optional embodiment of FIG. 11.

The assembly of the fishing line release clip is illustrated in FIG. 6. Cable clamping plate 14 and fishing line clamping plate 16 are mounted by inserting hinge posts 24 in hinge slot 26 in the sidewall 48 of clamping platform 12, with sliding clamp rings 18 and 20 fitting beneath platform 12 in recess 60. Sliding clamp rings 18 and 20 wrap around clamping platform and clamping plates 14 and 16. Resilient textured rubber pads 50 and 54 are inserted in recesses 52 and 56 respectively.

Thus, fishing line release clip 10 is comprised of only seven parts. Preferably, all the components shown in FIG. 6, with the exception of resilient pads 50 and 54, are injected molded synthetic parts. There are no metal parts to rust or deteriorate. Fishing line release clip 10 is self-contained and easy to use in all weather conditions.

As previously described, fishing line release clip 10 can be used with cable 42 and/or fishing line 44. To clamp a fishing line, the line is first placed in position between clamping platform 12 and clamping plate 16 on the textured surface of resilient clamping pad 54. Clamping plate 16 is then securely clamped against clamping platform 12 with glass line 44 between respective surfaces of resilient pad 54.

To clamp cable 42, between clamping platform 12 and clamping plate 14, cable 42 is set in notches or grooves 46 in sidewalls 48 of clamping platform 12, against the surface of resilient pad 50. Clamping plate 14 is closed by advancing sliding clamp 5 toward the clamping jaw with ridge 19 engaging detents 38 in upper surface of clamping plate 14. This securely clamps wire line 42 with sliding clamp 18 locked in place.

An optional embodiment having two methods of closing the clamping plates is illustrated in FIGS. 7 through 10. In this embodiment thumbwheel nut 65, bolt 67 and a sliding clamp 62 are used to secure clamping plates 64 and 66 respectively against clamping platform 68 as before. The thumbwheel nut 65 and bolt 67 fit in holes 71 and 73 are preferable on the cable side of release clip 10' to apply a greater clamping force. Hinge posts 70 and 72 on clamping plates 64 and 66 respectively, engage hinge slots 74 in sidewalls 76 of clamping platform 68.

Resilient rubber clamping pads 78 and 80 are positioned on clamping platform 68 with resilient clamping pad 82 fitted into recess 84 in clamping plate 66. Each resilient clamping pad 80 and 82 have a boss 86, fitting a recess 88 and 90 respectively in clamping plate 66 and clamping platform 68 to retain the resilient rubber pads in place. Sliding clamp 62 fits around clamping plate 66, and clamping platform 68 and may have a groove 93 engaging a lengthwise guide 94 on the bottom of clamping platform 68.

Sliding clamp 62 has a peripheral shoulder 63 for applying a lateral force with the fingers. Shoulder 63 assists in moving sliding clamp 62 forward on fishing line release clip 10' to close the clamp. A thumbwheel nut 65 and bolt 67 may be used to close the cable clamp on the other end of release clip 10'. This embodiment demonstrates the versatility and various constructions available in the release clip of the invention.

Fishing line clamping platform 68 has a slot or groove 69 for down-rig fishing and for receiving a wire or cable as before. To clamp a cable fishing line between the jaws of release clip 10', a cable is first placed beneath clamping plate 64 on textured resilient pad 78 in slot 69, and/or a fishing line is placed between resilient pads 80 and 82, beneath clamping plate 66. Thumbwheel 67 is tightened down to clamp the cable securely. Sliding clamp 62 is then advanced toward the end of respective clamping plate 66 with rib 92 engaging detents 96 in clamping plate. Advancing sliding clamp 62 toward the free end of clamping plate 66 securely clamps a fishing line between the jaws formed by clamping plate 66 and clamping platform 68. Rib 92 securely locks sliding clamp 62 in the position desired. Thus, a cable and a fishing line may be quickly and easily clamped between the respective jaws of the release clip 10' with sliding clamp 62 providing locking security. Clamping platform 68 is provided with a mounting flange 98 and mounting hole 99 for mounting fishing line release clip 10' on a surface or by a tether to the cable as before.

A third embodiment of a fishing line release clip is illustrated in FIGS. 11 through 14. In this embodiment, fishing line release clip 100 is comprised of a clamping platform 102 and a cover 104 for retaining button clamps 106 and 108 respectively. Clamping plates 110 and 112 are secured between cover 104 and clamping platform 102 by hinge posts 114 and 116, fitting hinge sockets 118, 120, 124 and 126 in cover 104 and clamping platform 102 respectively. Button clamps 106 and 108 are retained between cover 104 by flange 128 around the periphery of rectangular opening 130 in cover 104. Button clamps are provided with lengthwise flanges 107 and 109 that are retained by flange 128 in cover 104. This allows each push clamp 106 and 108 to slide forward or backward beneath cover 104. Angle surfaces or ramps 111 and 113, on clamping plates 110 and 112 respectively, are engaged by button clamps 106 and 108.

Hinge sockets 118, 120, 124 and 126 are formed in recess 123 of cover 104 and shoulder 125 on sidewall 127 of clamping platform 102. This arrangement provides alignment of cover 104 on clamping platform 102 with hinge posts 114 and 116 securely retained in hinge sockets 118, 120, 124 and 126. Hinge cover 104 can be secured to clamping platform 102 by any suitable means such as adhesive along mating surfaces.

Clamping platform 102 has slots 132 in sidewall 127 and a resilient pad 134 that fits recess 136. This end of clamping platform 102 is for receiving cable, but could be used with an additional fishing line if desired. As before, the opposite end of fishing line clip release 100 has resilient pads 136 and 138 having a textured surface as before, for receiving a fishing line. Resilient pad 136 fits in recess 140 in clamping platform 102. Resilient pads 136 and 138 can be secured by an adhesive or can include a boss, as shown in the embodiments of FIGS. 7 through 10 to hold them in place. Preferably, they are not permanently secured so that when they are worn they can be easily replaced.

To clamp a cable line beneath clamping plate 110, the cable is first passed through notches 132 and rests on resilient pad 134. Button slider clamp 106 is then advanced on ramp surface 111 on clamping plate 110 securely clamping the line in the fishing line clip release 100. A fishing line is clamped in clamping plate 112 by placing it between resilient pads 136 and 138, and advancing button slider clamps 108 on ramp surface 113. Surfaces 111 and 113 can have detents and button sliders 106 and 108 include ridges to provide a locking mechanism as in the previous embodiments if desired.

A fourth embodiment is shown in FIGS. 15 through 18. In this embodiment, fishing line clip release is comprised of a clamping platform 152 and a clamping plate 154 having a self-hinge 156 at the center fitting a hinge socket 158. A flange 160, having a mounting hole 162 for mounting fishing line release clip 150 to any suitable surface, is provided as before. Extra mounting hole 162 can also be used as previously described, with snap rings connected by a short leader or tether so the fishing line clip release could be attached to the cable to prevent loss if the cable should become loose from the clamp. In this embodiment, one snap ring would fit through hole 162, around flange 160 and another snap ring would fit around the cable. These two snap rings would then be joined by a line and acts as a tether. This arrangement provides a back-up connection to prevent loss of the fishing line release clip 150 should it come loose from the cable.

Clamping plate 154 has a cable clamp 164 at one end and a fishing line clamp 166 at the opposite end. The advantage of this construction is the use of a single homogeneous piece for both clamping ends incorporating a self-hinge 156. Clamping platform 152 has angled surfaces 168 for securely holding a cable in clamping end 164. A resilient textured rubber pad 172 fitting in cavity 174 aids in holding the cable beneath clamp 164.

A resilient rubber pad 176, having bosses 178, engaging holes 180 in fishing line clamp end 166 and hole 182 in clamping platform 152, securely clamps a fishing line.

Clampings ends 164 and 166 are tightened by means of bolts 184 and 186 and thumbwheels 188 and 190. To securely clamp a cable or fishing line, they are first placed between clamping ends 164 and 166, which are then tightened down by operating either thumbwheel 188 or thumbwheel 190.

The above features of the fishing line release clip make the device far more easy to use than those currently available, and allow for more applications in a single device than release clips known presently in the art. For cable fishing a number of fishing lines are distributed over the length of the cable, the clip can be securely clamped to the cable seated in the V-shaped socket on the clamping platform in each embodiment. A number of release clips can be placed at different depths along the cable, which is held taught by a massive weight at the end. An important feature of the invention is that the cable clamping end of the release clip can be easily loosened to allow "stacking" of the clamps if the user is trying to retrieve one line below the spaced apart clips. This will allow each clip to slide down the line without having to be removed from the cable (i.e., called "stacking").

The flange and mounting hole at the back can be used for dual purposes. One purpose would be to mount it on an extension arm of the hook setting device disclosed and described in U.S. Pat. application Ser. No. 08/504,646 filed Jul. 20, 1995. That application discloses a fishing line clamping device that has a single clamp that is cinched down by a wing nut. The flange and hole could also be used with snap rings to provide a tether to the cable. One snap ring would fit through the hole at the end of the flange and be connected by a line or cable to a second snap ring that would be snapped around the cable. This would provide a back-up device should the cable come loose from the flange, preventing loss of the release clip.

Thus, there has been disclosed, a novel and unique release clip that has many applications not available with existing devices. One end of the clip can be used to conveniently clamp a fishing line. The device is easy and convenient to use. The opposite end of the release clip employs a cable clamping device having a groove for securely clamping the device to a cable for cable fishing with multiple lines. A flange with a mounting hole is provided to tether the release clip to a cable or for mounting on a surface or an extended arm.

This invention is not to be limited by the embodiment shown in the drawings and described in the description which is given by way of example and not of limitation, but only in accordance with the scope of the appended claims.

What is claimed is:

1. A fishing line release clip comprising;
   a clamping platform having clamping surfaces on opposite ends and sidewalls;
   a pair of clamping plates having clamp surfaces formed to mate with said platform clamping surfaces thereby forming a clamping jaw on each end;
   hinge means removably mounting said clamping plates in said platform sidewalls;
   first and second sliding clamp means for adjustably clamping and locking said clamping plates with said jaws closed;
   whereby a fishing line may be clamped between one of said clamping jaws and be released by a force on said fishing line.

2. The release clip according to claim 1 wherein said clamping platform includes; cable retaining means for retaining a cable beneath one of said pair of clamping plates.

3. The release clip according to claim 2 in which said cable, retaining means comprises; a retaining notch formed in said platform.

4. The release clip according to claim 3 in which said retaining notch comprises a pair of V-shaped notches in opposite sidewalls of said clamping platform, said V-shaped notches constructed to receive and securely clamp a cable.

5. The release clip according to claim 4 including means for fastening said release clip to said cable to prevent its loss should said cable come loose from said one of said pair of clamping plates.

6. The release clip according to claim 5 in which said means for fastening said release clip includes a flange on one end of said clamping platform; and a mounting hole in said flange whereby said release clip can be mounted on a surface or fastened to said cable with snap rings joined by a tether.

7. The release clip according to claim 6 including lock means for securing said first and second sliding clamp means in selected positions.

8. The release clip according to claim 7 in which said lock means comprise a plurality of detents in surfaces of said pair of clamping plates means; and protrusions on said first and second sliding clamp means for selectively engaging selected detents to hold said first and second sliding clamp means.

9. The release clip according to claim 8 in which said protrusions comprise ridges in the underside of said first and second sliding clamp means for engaging selected detents.

10. The release clip according to claim 1 including resilient clamping pads beneath said pair of clamping plates having slip preventing surfaces to prevent a clamped line from slipping out of said pair of clamping plates.

11. The release clip according to claim 10 including retaining means for retaining said resilient pads beneath said pair of clamping plates.

12. The release clip according to claim 11 in which said retaining means comprise recesses in said platform; said resilient pads being constructed to fit in and be retained in said recesses.

13. The release clip according to claim 1 including lock means for securing said first and second sliding clamp means in selected positions.

14. The release clip according to claim 13 in which said lock means comprise a plurality of detents in surfaces of said pair of clamping plates; and protrusions on said first and second sliding clamp means for selectively engaging selected detents to hold said first and second sliding clamp means.

15. The release clip according to claim 14 in which said protrusions comprise ridges in the underside of said first and second sliding clamp means for engaging selected detents.

16. The release clip according to claim 1 in which said hinge means comprise;

a pair of slots in said sidewalls of said clamping platform;

hinge posts on said clamping plates rotatably engaging said pair of slots;

whereby said clamping plates can may be removed for replacement.

17. The release clip according to claim 16 in which said sliding clamp means wrap around said clamping platform and said clamping plates.

* * * * *